(12) United States Patent
Takahashi

(10) Patent No.: US 9,088,199 B2
(45) Date of Patent: Jul. 21, 2015

(54) MOTOR

(75) Inventor: Hiroshi Takahashi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 206 days.

(21) Appl. No.: 13/545,461

(22) Filed: Jul. 10, 2012

(65) Prior Publication Data

US 2013/0038158 A1 Feb. 14, 2013

(30) Foreign Application Priority Data

Aug. 9, 2011 (JP) .................................. 2011-173728

(51) Int. Cl.
*H02K 21/12* (2006.01)
*H02K 21/14* (2006.01)
*H02K 1/14* (2006.01)

(52) U.S. Cl.
CPC ................ *H02K 21/145* (2013.01); *H02K 1/14* (2013.01); *H02K 2201/12* (2013.01)

(58) Field of Classification Search
None
See application file for complete search history.

(56) References Cited

U.S. PATENT DOCUMENTS

| 5,379,864 A * | 1/1995 | Colby ............................. 187/393 |
| 5,633,551 A * | 5/1997 | Weh ............................... 310/266 |
| 6,897,595 B1 * | 5/2005 | Chiarenza ...................... 396/428 |
| 7,911,107 B2 * | 3/2011 | Nashiki .......................... 310/208 |
| 8,120,215 B2 * | 2/2012 | Nashiki ...................... 310/49.45 |
| 2008/0240706 A1 * | 10/2008 | Akiba .................... 310/216.043 |

FOREIGN PATENT DOCUMENTS

| CN | 101189782 A | 5/2008 |
| CN | 102035329 A | 4/2011 |
| JP | 3645663 | 2/2005 |
| JP | 4085059 | 2/2008 |
| JP | 4140783 | 6/2008 |

OTHER PUBLICATIONS

Office Action issued Aug. 26, 2014 in Japanese Patent Application No. 2011-173728 (with English language translation).
Office Action issued Nov. 11, 2014 in Japanese Office Action No. 2011-173728 (with English translation).

* cited by examiner

*Primary Examiner* — Tran Nguyen
(74) *Attorney, Agent, or Firm* — Oblon, McClelland, Maier & Neustadt, L.L.P.

(57) ABSTRACT

According to one embodiment, a motor includes at least two base units. The base units are arranged along an axis of rotation of the motor. The base units each includes a rotor unit and an armature unit. The rotor unit is formed cylindrical, rotatable about the axis of rotation, and provided with permanent magnets. The armature unit includes a plurality of tripolar armature cores, and a first annular coil and a second annular coil coaxial with respect to the axis of rotation. In each of the at least two base units, the first annular coil is provided in a first annular space, the second annular coil is provided in a second annular space, and opposite currents are applied to the first and second annular coils.

7 Claims, 15 Drawing Sheets

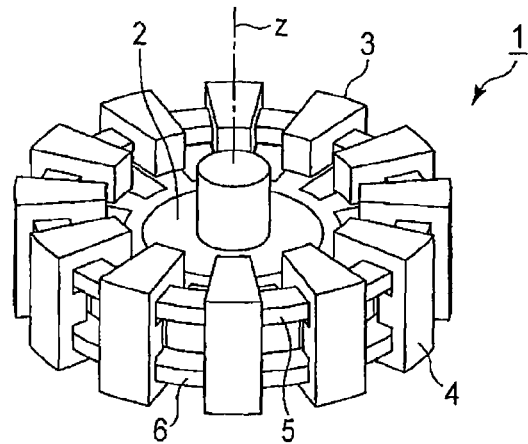
F I G. 1
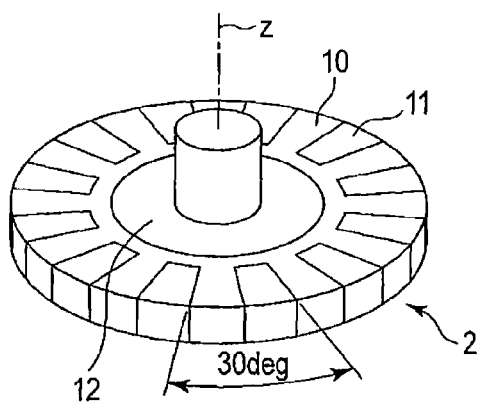
F I G. 2A
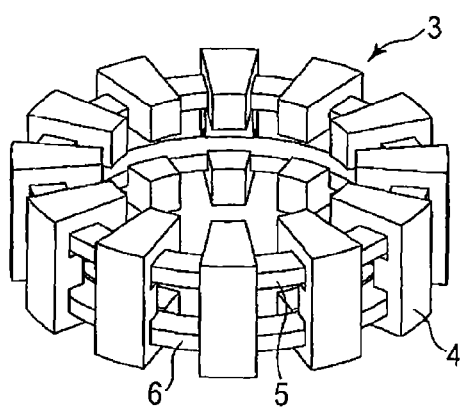
F I G. 2B
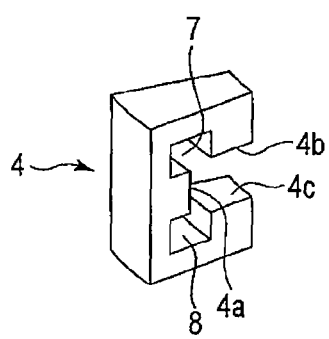
F I G. 2C
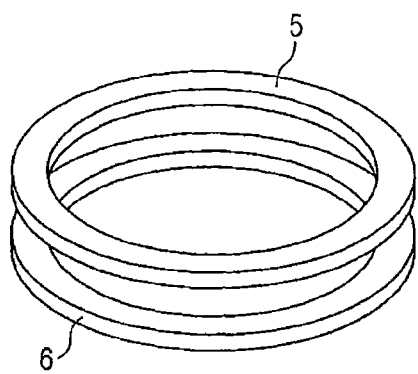
F I G. 2D

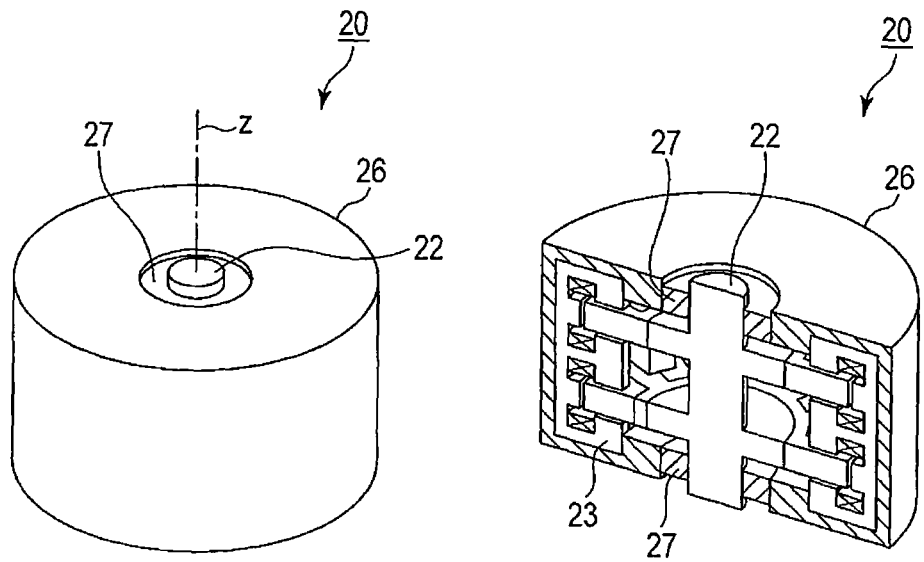
F I G. 7A　　　F I G. 7B
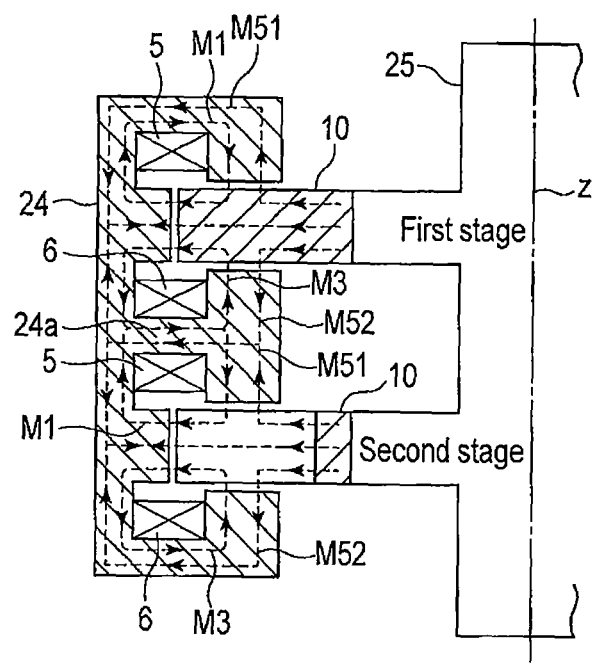
F I G. 8

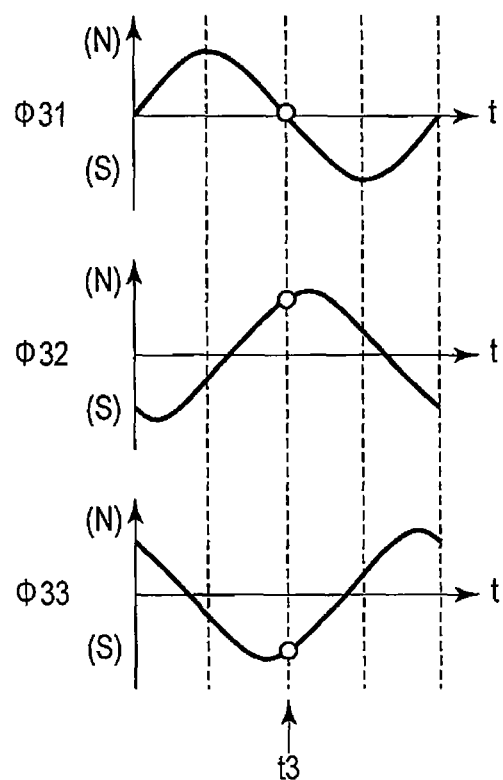
F I G. 14

← Attractive force
←-- Repulsive force

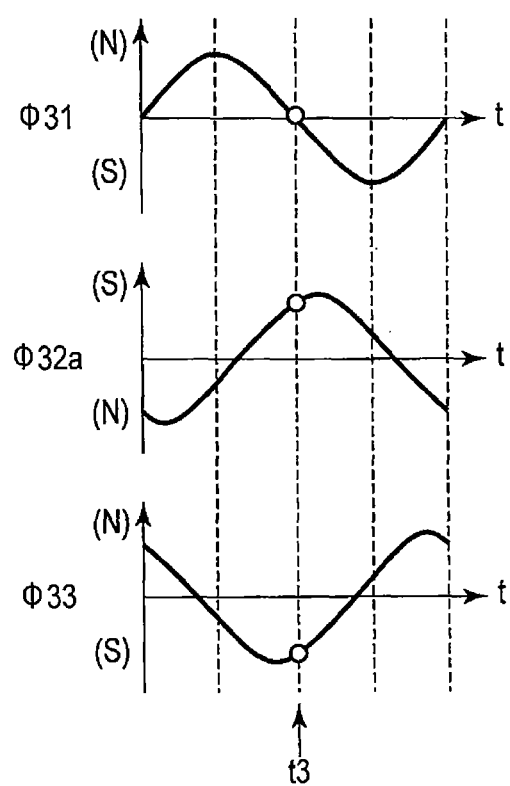
F I G. 16

MOTOR

CROSS-REFERENCE TO RELATED APPLICATIONS

This application is based upon and claims the benefit of priority from prior Japanese Patent Application No. 2011-173728, filed Aug. 9, 2011, the entire contents of which are incorporated herein by reference.

FIELD

Embodiments described herein relate generally to electromagnetic motors, and more particularly to transversal magnetic flux motors that generate magnetic paths along the axis of rotation thereof.

BACKGROUND

For the purpose of power saving, $CO_2$ reduction, etc., there is a demand for further enhancing the functionality of electromagnetic motors, whereby enhancements in performance, represented by reduction in size and weight and increases in efficiency, torque and output, etc., are now being made significantly. When electromagnetic motors are roughly classified based on magnetic flux direction, they can be grouped into (1) radial flux motors, (2) axial flux motors and (3) transversal flux motors. Among these types, the radial flux motors are excellent especially in cost performance, and have been widely used so far for various products as typical machinery elements for versatile actuators. The axial flux motors have such a structural feature that they can be adapted to complex three-dimensional magnetic paths, but conventionally widely used laminated steel plates are hard to use for them. The axial flux motors are used as, in particular, medium/large-size thin motors of a large bore diameter.

Further, the transversal flux motors are each characterized by a structure in which base units are arranged along the rotation axis of the motor in two or more stages at predetermined relative phase angles with respect to the rotation axis, each base unit comprising a rotor with permanent magnets, and an armature (forming a division-type toroidal core structure) provided with an annular coil provided around the rotation axis of the rotor, and with a plurality of substantially U-shaped stator cores (hereinafter, "U-shaped stator cores") circumferentially provided around the annular coil. This structure can relatively easily produce a highly efficient magnetic field, utilizing high torque resulting from the multi-stage structure and the division-type toroidal core structure. Namely, in general, the transversal flux motors can be easily made to have multi-polarity since it is sufficient if a plurality of U-shaped stator cores are arranged around the rotation axis, compared to a radial flux motor or an axial flux motor that needs a dead space for, for example, assembling and inserting a stator core with a plurality of slots arranged around the rotation axis, and a coil wound on the slot portions. Furthermore, since in the transversal flux motors, the armature comprising the annular coil and the U-shaped stator cores (division-type toroidal cores) is of a structure in which the magnetic flux generated by the coil does not easily leak out, the magnetic field production efficiency by the coil is high. Therefore, the transversal flux motors can be made more compact than the radial flux motors or axial flux motors.

JP-B No. 408059, for example, discloses a conventional motor.

However, in the disclosed conventional transversal flux motor, U-shaped stator cores are employed, and the two magnetic pole portions of each U-shaped stator core are arranged along the rotation axis. At least two permanent magnets for generating torque are provided at the appropriate portions of the rotor corresponding to the armature with the U-shaped stator cores, with the result that the axial length of the rotor becomes long and hence the base unit cannot be made compact.

Moreover, in the case of the multi-stage structure, it is necessary to provide, in view of preventing magnetic interference, a plurality of base units with a predetermined magnetic space between each pair of adjacent base units. This further increases the size of the motor.

In addition, the long axis of the rotor as a rotary machine is not always satisfactory in the aspect of performance, since reduction of high-speed response due to an increase in the inertia of the rotor, and degradation of stability of rotation due to the vibration characteristic of the rotor, will be involved. As a result, the motor size is inevitably increased and the motor becomes more expensive.

BRIEF DESCRIPTION OF THE DRAWINGS

FIG. 1 is a perspective view illustrating a base unit for motors according to an embodiment;

FIG. 2A is a perspective view illustrating the rotor unit shown in FIG. 1, FIG. 2B is a perspective view illustrating the armature unit shown in FIG. 1, FIG. 2C is a perspective view illustrating an armature magnet core shown in FIG. 1, and FIG. 2D is a perspective view illustrating the first and second annular coils shown in FIG. 1;

FIG. 7A is a perspective view illustrating a motor including a casing, and FIG. 7B shows a longitudinal cross section of the motor taken along the rotation axis z;

FIG. 8 is an enlarged view of the cross section shown in FIG. 7B, illustrating the magnetic paths of the magnetic fluxes produced by each permanent magnet and the first and second annular coils;

FIG. 14 is a view useful in explaining the operation of the motor 40 of the embodiment, and illustrating the time history of all coil magnetic fluxes;

FIG. 16 is a view useful in explaining the operation of a motor 40A obtained by modifying the motor 40, and illustrating the time history of all coil magnetic fluxes;

DETAILED DESCRIPTION

Figure 3A:
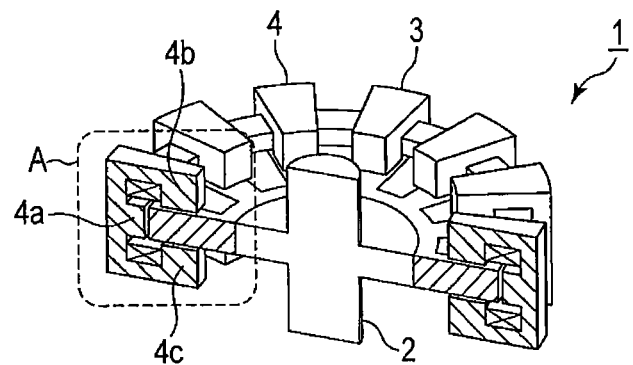
FIG. 3A shows a longitudinal cross section of the base unit taken along the rotation axis z of the base unit.

Motors according to an embodiment will be described in detail with reference to the accompanying drawings. In the embodiment, like reference numbers denote like elements, and duplication of explanation will be omitted.

In light of the above-described circumstances, the embodiment has been developed and aims to provide motors of a structure that can eliminate the problems of the conventional motors, namely, that enables the axial length of the rotor of a base unit to be made short and hence enables the base unit to be made compact, and also enables the base unit to have a multi-stage structure without a magnetic clearance used to prevent magnetic interference, resulting in reduction of the entire motor size.

In general, according to one embodiment, a motor includes at least two base units. The at least two base units are arranged along an axis of rotation of the motor. The at least two base units each includes a rotor unit and an armature unit. The rotor unit is formed cylindrical, rotatable about the axis of rotation, and provided with permanent magnets. The armature unit includes a plurality of tripolar armature cores, and a first annular coil and a second annular coil coaxial with respect to the axis of rotation. The tripolar armature cores each has a first magnetic pole portion, a second magnetic pole portion and a third magnetic pole portion. The first to third magnetic pole portions oppose a plurality of surfaces of the rotor unit with a space defined therebetween. The rotor units or the armature units of the at least two base units are circumferentially shifted from each other by a relative angle. The tripolar armature cores of each of the at least two base units are arranged around a circumference of the rotor unit of the each of the at least two base units. In each of the at least two base units, the first annular coil is provided in a first annular space defined by the first and second magnetic pole portions opposing the rotor unit, the second annular coil is provided in a second annular space defined by the first and third magnetic pole portions opposing the rotor unit, and opposite currents are applied to the first and second annular coils.

Referring first to FIGS. 1 to 4B, the base unit of each motor of the embodiment will be described.

FIG. 1 is a perspective view illustrating a base unit 1 for the motors according to the embodiment. The base unit 1 comprises a rotor unit 2 and an armature unit 3. The armature unit 3 comprises armature cores 4, a first annular coil 5 and a second annular coil 6.

FIGS. 2A to 2D are perspective views illustrating the individual structural elements of the base unit 1. Specifically, FIG. 2A shows the rotor unit 2, FIG. 2B shows the armature unit 3, FIG. 2C shows one of the armature magnet cores 4, and FIG. 2D shows the first and second annular coils 5 and 6.

The rotor unit 2 is supported by a bearing (not shown) such that it can rotate about a rotation axis z. The rotor unit 2 is disc-shaped and provided with permanent magnets. The armature unit 3 is provided around the rotor unit 2.

The armature magnet cores 4 are provided around the rotor unit 2 at diametrically regular intervals. In the case shown in FIGS. 1 and 2A to 2D, 12 armature cores are provided.

As shown in FIG. 1 and FIGS. 2B and 2D, the first and second annular coils 5 and 6 are provided around the rotation axis z.

As shown in FIG. 2A, the rotor unit 2 comprises a rotor core portion 10 of a 12-teeth gear shape provided around the rotation axis z, 12 permanent magnets 11, and an annular rotor core portion 12 provided around the rotation axis z, the gear-shaped core portion and the magnets 11 being circumferentially alternately arranged with a circumferential pitch of 30 degrees. The rotor core portions 10 and 12 are integral mechanically and magnetically. Alternatively, the rotor core portions 10 and 12 may be constructed such that they are mechanically independent of each other but magnetically integral. The rotor cores 10 and the permanent magnets 11 provide a peripheral portion of the rotor unit 2. The armature cores 4 and the rotor core portions 10 and 12 are formed of a ferromagnetic material, and function to form magnetic paths for the magnetic fluxes produced by the permanent magnets 11 and the magnetic fluxes produced by the first and second annular coils 5 and 6. For the purpose of reducing iron loss during motor rotation, it is more preferably to use dust cores. In the case of dust cores, they may be formed integral as one body. Further, although in the embodiment, the gear-shaped core portion and the magnets 11 are circumferentially alternately arranged with a circumferential pitch of 30 degrees, the embodiment is not limited to this. The number of the gear teeth of the rotor core 10 and that of the permanent magnets are merely parameters of choice determined from desired apparatus specifications.

Each of the armature cores 4 has such a shape as shown in FIG. 2C. It has a first magnetic pole portion 4a opposing the peripheral surface portion of the rotor unit 2 with a predetermined space therebetween, and has a second magnetic pole portion 4b opposing the upper surface of the rotor unit 2 with a predetermined space therebetween, the upper surface being perpendicular to the rotation axis z. Each armature core 4 also has a third magnetic pole portion 4c opposing the lower surface of the rotor unit 2 with a predetermined space therebetween, the lower surface being perpendicular to the rotation axis z. The first annular coil 5 is provided in a space 7 defined substantially annular as a whole by the first and second magnetic pole portions 4a and 4b of the cores 4 and the rotor unit 2. Similarly, the second annular coil 6 is provided in a space 8 defined substantially annular as a whole by the first and third magnetic pole portions 4a and 4c of the cores 4 and the rotor unit 2.

Referring then to FIGS. 3A to 3D, a description will be given of the magnetic paths of the magnetic fluxes produced by the first and second annular coils 5 and 6 of the base unit 1.

Figures 3B, 3C:
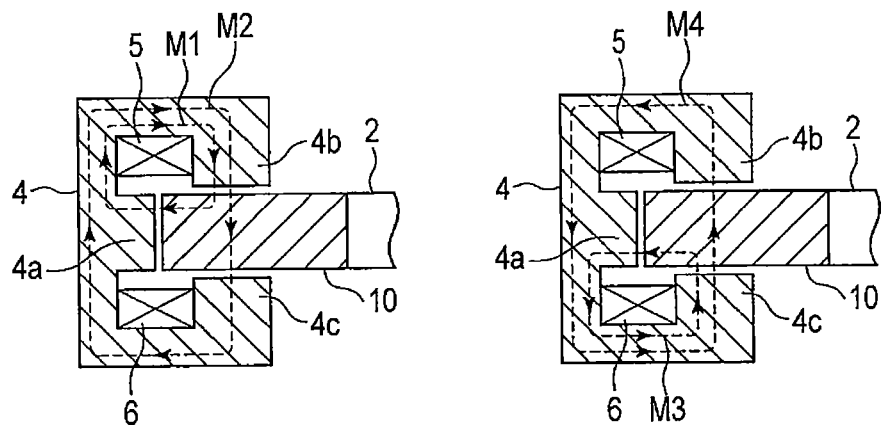
FIG. 3B shows a cross section of the section A shown in FIG. 3A, which is useful in explaining magnetic fluxes M1 and M2 produced by the first annular coil.
FIG. 3C shows a cross section of the section A, which is useful in explaining magnetic fluxes M3 and M4 produced by the second annular coil.
Figure 3D:
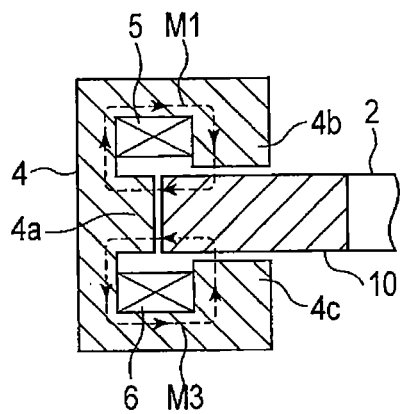
FIG. 3D shows a cross section of the section A, which is useful in explaining the magnetic fluxes M1 and M3 produced by the first and second annular coils.

FIGS. 3A to 3D show the magnetic paths of the magnetic fluxes produced by the first and second annular coils 5 and 6 of the base unit 1. Specifically, FIG. 3A shows a longitudinal cross section of the base unit 1 taken along the rotation axis z of the base unit, and FIGS. 3B to 3D show cross sections of the section A shown in FIG. 3A. FIG. 3B is a view useful in explaining magnetic fluxes M1 and M2 produced by the first annular coil 5, FIG. 3C is a view useful in explaining magnetic fluxes M3 and M4 produced by the second annular coil 6, and FIG. 3D is a view useful in explaining the magnetic fluxes M1 and M3 produced by the first and second annular coils 5 and 6. Currents of opposite directions are passed through the first and second coils 5 and 6.

When a current is passed through the first annular coil 5, a closed loop magnetic flux M1 is produced, which passes through the first and second magnetic pole portions 4a and 4b of each armature core 4, enters the rotor core 10 of the rotor unit 2 through the space defined by the upper surface of the rotor unit 2, and returns to the first magnetic pole portion 4a through the space defined by the peripheral surface of the rotor unit 2. Further, a closed loop magnetic flux M2 is produced, which passes through the second magnetic pole portion 4b of each armature core 4, enters the rotor core 10 of the rotor unit 2 through the space defined by the upper surface of the rotor unit 2, and returns to the second magnetic pole portion 4b through the space defined by the lower surface of the rotor unit 2 and the third magnetic pole portion 4c. Similarly, when a current is passed through the second annular coil 6, a closed loop magnetic flux M3 is produced, which passes through the first and third magnetic pole portions 4a and 4c of each armature core 4, and also a closed loop magnetic flux M4 is produced, which passes through the third and second magnetic pole portions 4c and 4b of each armature core 4.

Since the closed loop magnetic fluxes M2 and M4 are of the opposite directions and hence offset each other, only the closed loops M1 and M3 remain under ideal conditions as shown in FIG. 3D. As a result, the magnetic flux produced in the space between the peripheral surface of the rotor unit 2 and the first magnetic pole portion 4a becomes greater than that produced in the space between the second and third magnetic pole portions 4b and 4c.

Figure 4A:
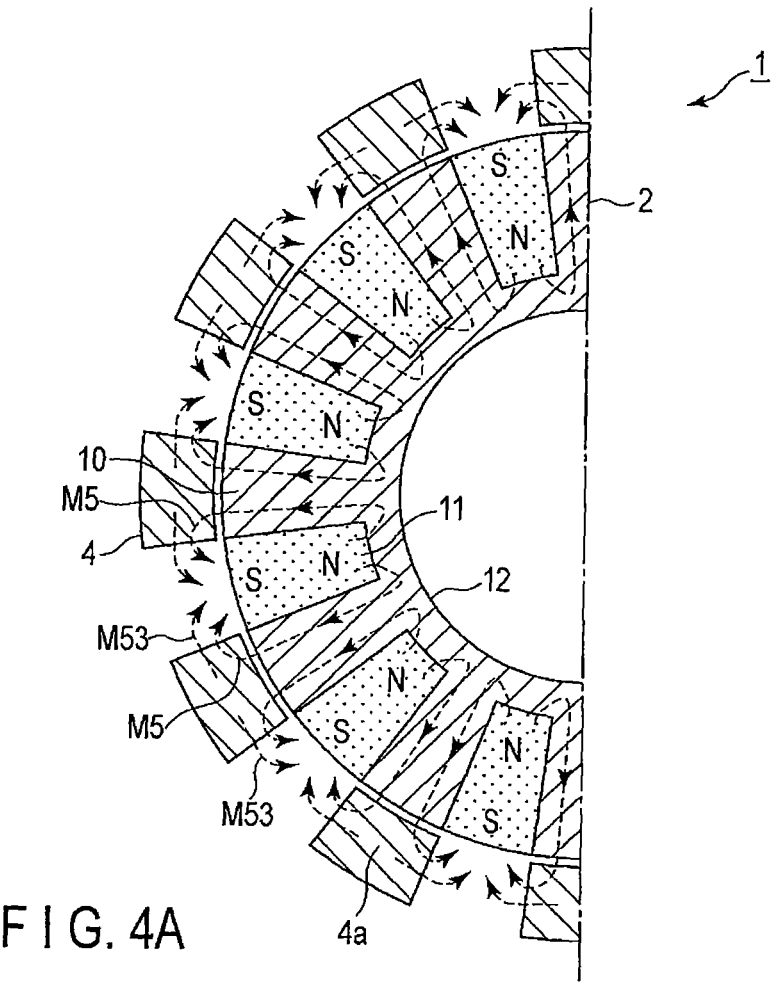
FIG. 4A shows the left half of the cross section of the base unit, which is taken perpendicular to the rotation axis z and useful in explaining the magnetic paths of the magnetic fluxes produced by permanent magnets 11.
Figure 4B:
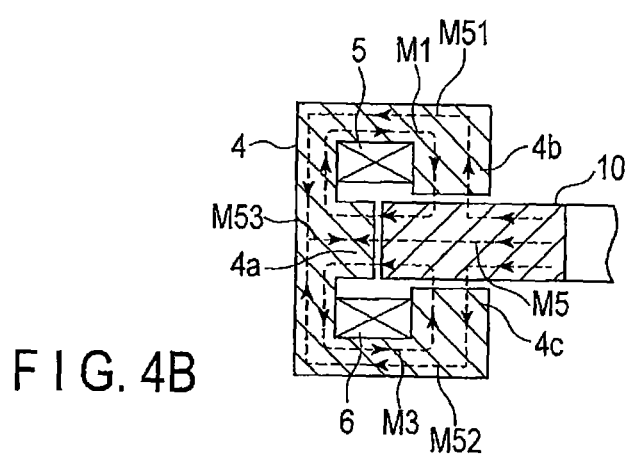
FIG. 4B shows a cross section of the section A shown in FIG. 3A, which is useful in explaining a magnetic flux including magnetic fluxes M5, M51, M52 and M53 produced by each permanent magnet 11.

Referring then to FIGS. 4A and 4B, the magnetic paths of the magnetic fluxes produced by the permanent magnets 11 of the motor base unit 1 will be described.

FIGS. 4A and 4B show the magnetic paths of the magnetic fluxes produced by the permanent magnets 11 of the motor base unit 1 of the motor. FIG. 4A shows the left half of the cross section of the base unit, which is taken perpendicular to the rotation axis z and useful in explaining the magnetic paths of the magnetic fluxes produced by permanent magnets 11, and FIG. 4B shows a cross section of the section A shown in FIG. 3A, which is useful in explaining a magnetic flux including magnetic fluxes M5, M51, M52 and M53 produced by each permanent magnet 11.

The permanent magnets 11 are radially arranged in all directions, with their ends as the outer surfaces of the rotor unit 2 set to S poles, and the other ends close to the rotation axis z set to N poles. At each permanent magnet 11, a closed loop magnetic flux M5 is produced. The magnetic flux M5 is output from the N pole, passes the rotor core 12, then passes the rotor core 10, enters the rotor core 10, then enters the first magnetic pole portion 4a through the space between the rotor unit 2 and the armature unit 4, reaches the S pole of the each permanent magnet 11 through a circumferential portion of the armature unit 4, and returns to the N pole. As a result, clockwise and counterclockwise closed loop magnetic fluxes M5 are formed at the twelve permanent magnets 11 between respective pairs of adjacent circumferential portions of the rotor core 10. Since thus, a plurality of rotor cores 10 and a plurality of permanent magnets 11 are alternately arranged with a predetermined circumferential pitch, and all of the permanent magnets 11 are radially positively magnetized or radially negatively magnetized in the rotor unit 2, the motor of the embodiment can be more easily magnetized and can be more suppressed in degradation of magnetization performance, than the conventional motor in which the magnets are magnetized in different directions. Consequently, the embodiment can realize a motor suppressed in driving performance degradation and production cost.

Each permanent magnet 11 further has a magnetic flux M51 directed from the rotor core 10 to the second pole portion 4b through a predetermined space therebetween, and a magnetic flux M52 directed from the rotor core 10 to the third pole portion 4c through a predetermined space therebetween, the magnetic fluxes M51 and M52 joining together at the armature core 4 near the first pole portion 4a, thereby forming a magnetic flux M53. The magnetic flux M53 is a closed loop flux, similar to the magnetic flux M5, which is output from a circumferential portion of the armature core 4, passed through the space and the S pole, and returned to the N pole. The magnetic flux M51 of the permanent magnet 11 and the magnetic flux M1 of the first annular coil 5 offset each other since their directions are opposite. Therefore, under ideal conditions, the magnetic flux of the second magnetic pole portion 4b can be set to zero or a very low value, with the result that the core area forming the magnetic path of the second magnetic pole portion 4b can be made compact to thereby reduce the size and weight of the armature core 4.

Similarly, the magnetic flux M52 of each permanent magnet 11 and the magnetic flux M53 of the second annular coil 6 offset each other. Therefore, under ideal conditions, the magnetic flux of the third magnetic pole portion 4c can be set to zero or a very low value, with the result that the core area forming the magnetic path of the third magnetic pole portion 4c can be made compact to thereby further reduce the size and weight of the armature core 4.

Furthermore, since the base unit of the motor comprises the armature core provided with the first magnetic pole portion provided on the peripheral surface of the rotor unit, and the second and third magnetic pole portions provided on the upper and lower surfaces of the rotor unit perpendicular to the rotation axis, the thickness of the rotation section along the rotation axis can be further reduced, thereby further enhancing the function and advantage of the motor as a rotary machine.

Referring then to FIGS. 5 to 11B, a motor 20 comprising the base unit 1 of the embodiment will be described in detail.

Figure 5:
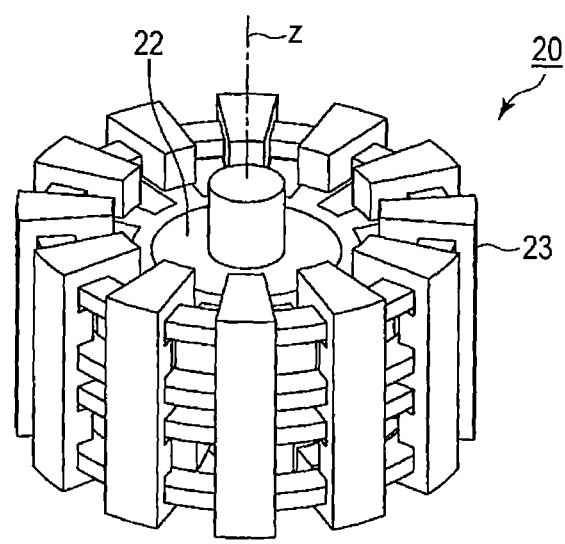
FIG. 5 is a perspective view illustrating a motor 20 according to the embodiment.
Figure 6A:
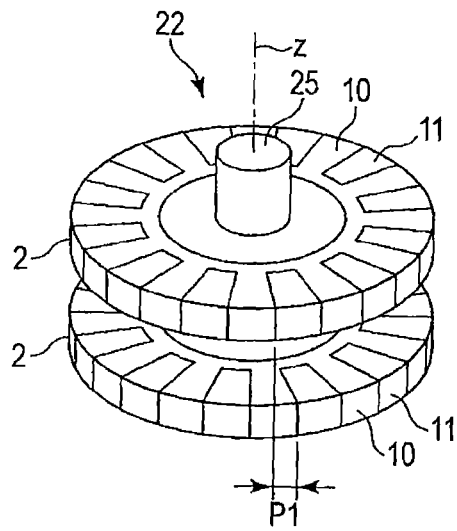
FIG. 6A is a perspective view illustrating the rotor unit shown in FIG. 5.
Figure 6B:
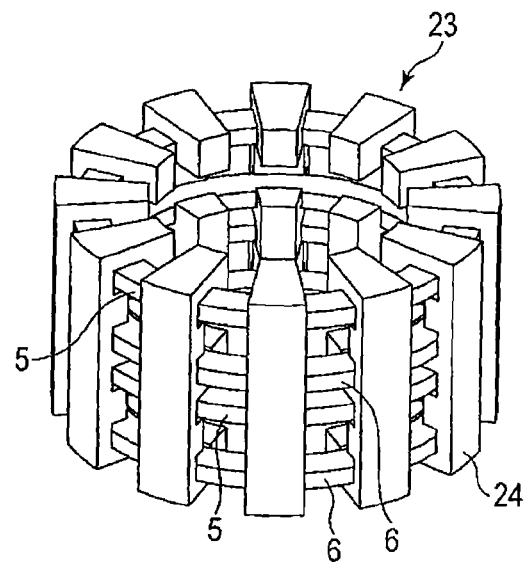
FIG. 6B is a perspective view illustrating the armature unit shown in FIG. 5.
Figure 6C:
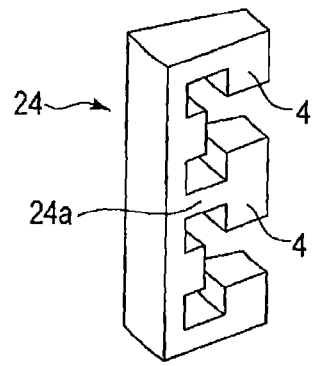
FIG. 6C is a perspective view illustrating an armature magnet core group 24 shown in FIG. 6B.

FIG. 5 is a perspective view illustrating the motor 20 according to the embodiment. FIG. 6A is a perspective view illustrating a rotor unit 22, FIG. 6B is a perspective view illustrating an armature unit 23, and FIG. 6C is a perspective view illustrating one of armature magnet core groups 24. Since the motor 20 is mainly formed of the base unit 1 shown in FIGS. 1 to 4B, no detailed description will be given of the elements already described above.

As shown, the motor 20 comprises the rotor unit 22 and the armature unit 23. As shown in FIG. 6A, the rotor unit 22 comprises two rotor units 2 that are similar to the above-mentioned rotor unit 2 of the base unit 1 and are arranged in two stages with a predetermined space therebetween. The two rotor units 2 are secured to a common rotor shaft 25, shifted with a relative circumferential angle P1. The relative angle P1 can be calculated from the circumferential pitch of 30 degrees with which the twelve rotor cores 10 and twelve permanent magnets 11 are arranged. Namely, the relative angle P1 is 7.5 degrees. As shown in FIG. 6C, each armature core group 24 comprises two armature cores 4 that are similar to the above-described armature cores 4 of the base unit 1 and are arranged in two stages along the rotation axis z with a predetermined space therebetween. Each armature core group 24 further comprises a common magnetic circuit portion 24a formed by mechanically and electrically connecting part of the magnetic path including the third magnetic pole portion 4c of the upper armature core 4, to part of the magnetic path including the second magnetic pole portion 4b of the lower armature core 4.

The motor 20 has a multi-stage structure comprising at least two base units arranged in two stages along the rotation axis. In the case of, for example, a two-stage structure, it is sufficient if two rotor units 2 with permanent magnets are arranged in two stages as shown in FIG. 6A. This structure enables the axial length of the whole rotor unit 22 to be made shorter than the conventional motor using U-shaped armature cores, which needs four disk-shaped rotor units arranged along the rotation axis. The structure can solve the problems of the conventional motors resulting from reduction of high-speed responsiveness due to an increase in the inertia of the rotor unit, and resulting from degradation in rotational stability due to the mechanical vibration characteristic of the rotor unit. As a result, enhancement in motor driving characteristics, reduction in the size and weight of the motor, and hence reduction in manufacturing cost, can be expected. Further, if the number of stages of rotor units is increased to three or more to increase the torque and output of the motor, the difference in the whole axial length of the rotor units and that of the conventional rotor unit results in a difference in motor driving performance, reduction of size and weight of the motor, and reduction of the manufacturing cost. Namely, the embodiment will become significantly distinguishable from the conventional motors.

FIG. 7A shows the motor 20 along with its casing 26, and FIG. 7B shows a longitudinal cross section of the motor 20 taken along the rotation axis z. As shown, the armature unit 23 is housed in the casing 26 such that the rotor unit 22 can be rotated by a bearing 27 about the rotation axis z. FIG. 8 is an enlarged view of the cross section shown in FIG. 7B, illustrating the magnetic paths of the magnetic fluxes produced by each permanent magnet 11 and the first and second annular coils. The magnetic fluxes generated by each permanent magnet 11 have already been explained referring to FIGS. 3A to 3D, and those generated by the annular coils 5 and 6 have also been explained referring to FIGS. 4A and 4B. Therefore, a description will be given of different portions only.

In the common magnetic circuit portion 24a of each armature core group 24, a magnetic flux M3 in the upper base unit and a magnetic flux M1 in the lower base unit pass in the same direction and hence reinforce each other. Similarly, a magnetic flux M52 in the upper base unit and a magnetic flux M51 in the lower base unit pass in the same direction and hence reinforce each other. In contrast, the magnetic fluxes M3 and M1 offset the magnetic fluxes M52 and M51. Thus, under ideal conditions, the magnetic flux of the common magnetic circuit portion 24a can be set to zero or a very low value, with the result that the required core area for the magnetic path of the common magnetic circuit portion 24a can be reduced to thereby reduce the axial length of the entire rotor unit. This minimizes an increase in the axial length of the rotor unit of a multi-stage structure, thereby suppressing reduction of high-speed response due to an increase in the inertia of the rotor unit, and degradation of rotational stability due to the vibration characteristic of the rotor unit, and realizing enhancement of motor driving characteristics and reduction of the size, weight and manufacturing cost of the motor apparatus. The greater the number of stages, the greater the advantage of the common magnetic circuit portions 24a.

Referring to FIGS. 9 to 11B, the operation of the motor 20 of the embodiment will be described.

Figure 9:
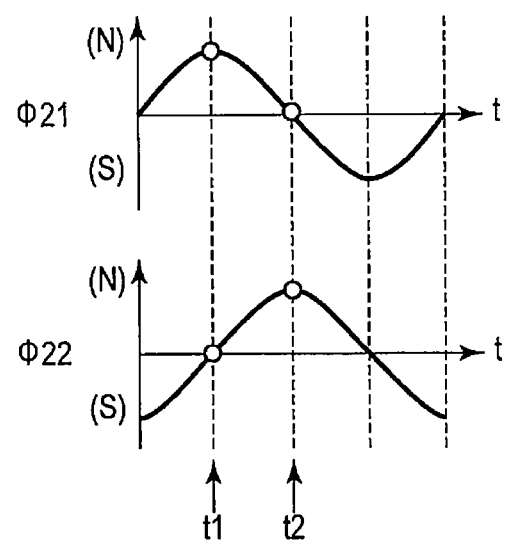
FIG. 9 is a view useful in explaining the operation of the motor 20 of the embodiment, and illustrating the time history of all coil magnetic fluxes.
Figure 10A:
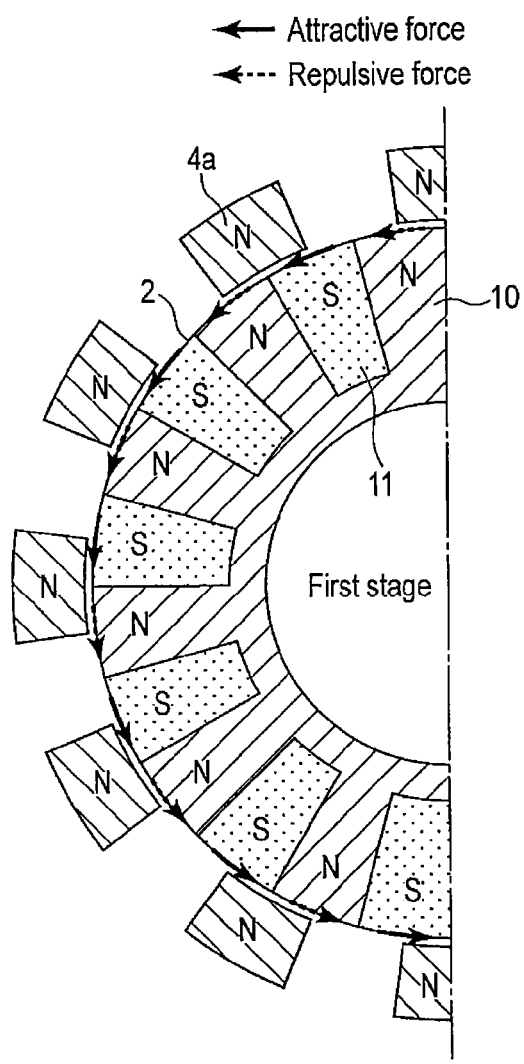
FIG. 10A shows the torque produced by an upper (first stage) base unit at a time point t1 in FIG. 9.
Figure 10B:
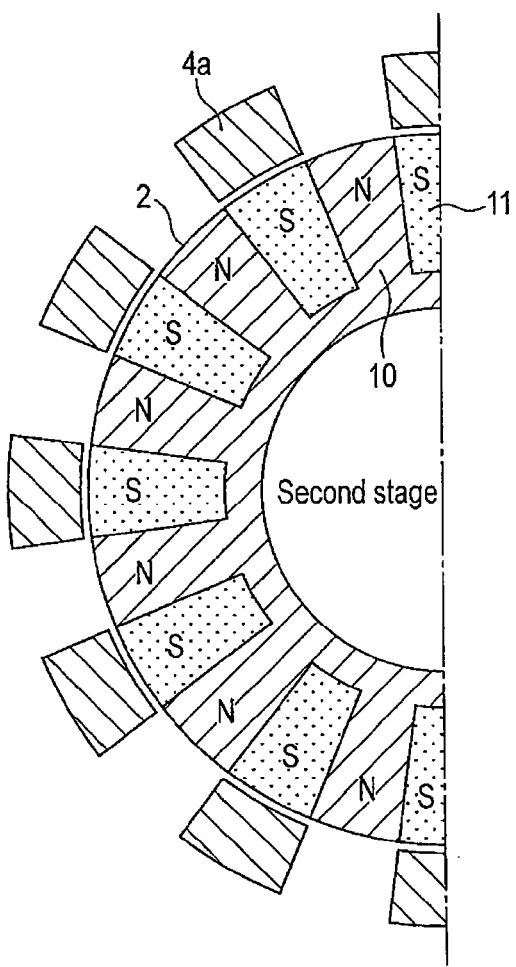
FIG. 10B shows the torque produced by a lower (second stage) base unit at the time point t1.

The upper portion of FIG. 9 shows the time history of the whole coil flux φ21 generated by the first and second annular coils 5 and 6 of the base unit of the first stage, and the lower portion of FIG. 9 shows the time history of the whole coil flux φ22 generated by the first and second annular coils 5 and 6 of the base unit of the second stage. The two alternate currents shown in FIG. 9 have a relative electrical phase angle of 90 degrees. If both the magnetic fluxes φ21 and φ22 have positive values, an N pole is formed at the first magnetic pole portion 4a of each base unit 1. In contrast, if both the magnetic fluxes φ21 and φ22 have negative values, an S pole is formed at the first magnetic pole portion 4a of each base unit 1. FIGS. 10A and 10B show the torque generated at a time point t1 in FIG. 9 by the upper base unit (of the first stage) and the lower base unit (of the second stage). Similarly, FIGS. 11A and 11B show the torque generated at a time point t2 in FIG. 9 by the upper base unit (of the first stage) and the lower base unit (of the second stage).

Figures 11A, 11B:
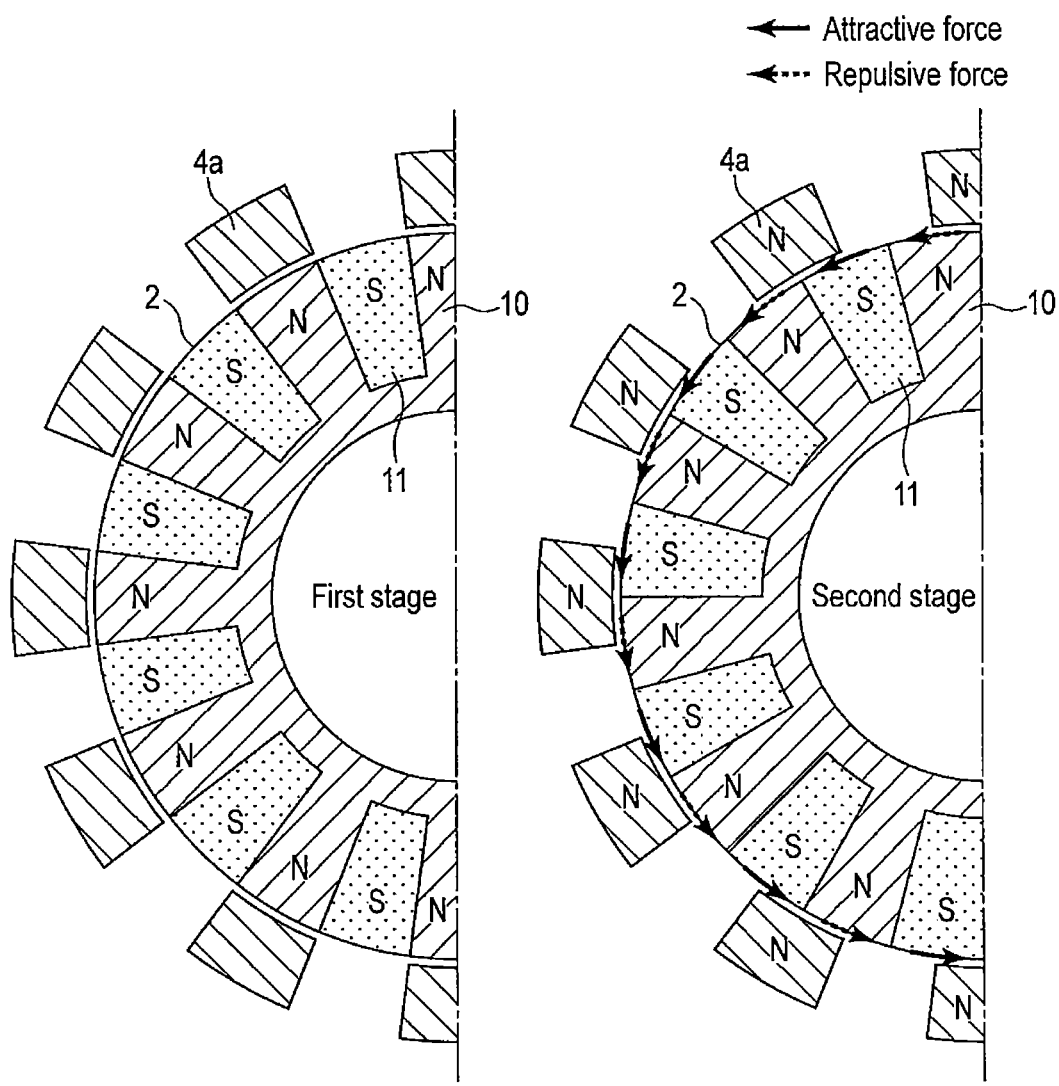
FIG. 11A shows the torque produced by the upper (first stage) base unit at a time point t2 in FIG. 9.
FIG. 11B shows the torque produced by the lower (second stage) base unit at the time point t2.

In FIGS. 10A, 10B, 11A and 11B, at the peripheral surface of the rotor unit 2, N poles are formed in the rotor core 10 and S poles are formed in the permanent magnets 11. These N and S poles magnetically cooperate with the polar character of each first magnetic pole portion 4a varying with time in accordance with the alternate current, to thereby impart, to the rotor unit 2, the torque due to attractive force and the torque due to repulsive force. More specifically, in the upper (first-stage) base unit, as shown in FIG. 10A, N poles are formed at the first magnetic pole portions 4a at the time point t1, and therefore repulsive forces occur between the N poles of the first magnetic pole portions 4a and those of the rotor core 10 and attractive forces occur between the N poles of the first magnetic pole portions 4a and the S poles of the permanent magnets 11, thereby imparting torque to the rotor unit 2. In contrast, in the lower (second-stage) base unit, as shown in FIG. 10B, no poles are formed at the first magnetic pole portions 4a and therefore no torque occurs in the rotor unit 2 at the same time point t1. Further, at the time point t2, by the effect opposite to that shown in FIGS. 10A and 10B, torque does not occur at the upper (first-stage) base unit and does occur at the lower (second-stage) base unit, as is shown in FIGS. 11A and 11B. Since thus, torque occurs alternately at the upper and lower (first- and second-stage) base units, continuous rotation as a property of a motor is realized.

Referring to FIGS. 12 to 15C, a description will be given of a motor 40 according to the embodiment, which has a structure employing a plurality of base units similar to the above-described base unit 1.

Figure 12:
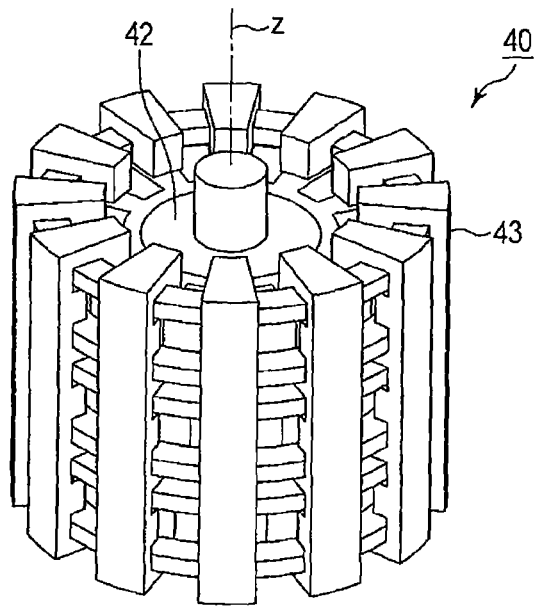
FIG. 12 is a perspective view illustrating a motor 40 according to the embodiment.
Figure 13A:
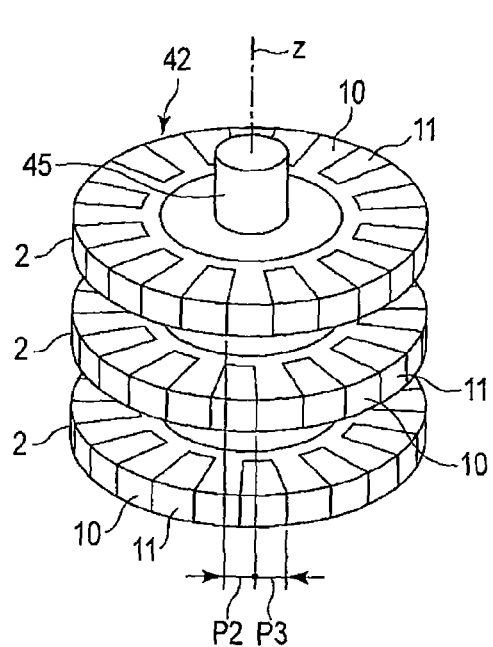
FIG. 13A is a perspective view illustrating the rotor unit shown in FIG. 12.
Figure 13B:
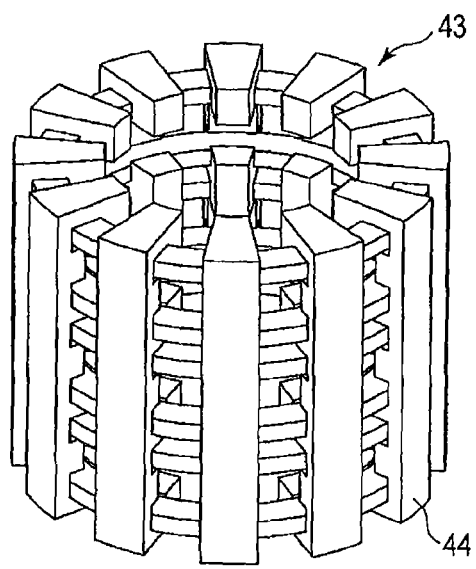
FIG. 13B is a perspective view illustrating the armature unit shown in FIG. 12.

FIG. 12 is a perspective view illustrating the motor 40 of the embodiment, and FIGS. 13A and 13B are a perspective view illustrating the individual elements of the motor 40. More specifically, FIG. 13A is a perspective view of a rotor unit 42, and FIG. 13B is a perspective view illustrating an armature unit 43. The motor 40 is constructed based on the base unit 1 shown in FIGS. 1 to 4B, and has a concept of a multi-stage structure similar to the motor 20 shown in FIGS.

5 to 11B and comprising a two-stage base unit. Therefore, regarding the motor 40, duplication of description will be avoided.

The motor 40 comprises a rotor unit 42 and an armature unit 43. The rotor unit 42 has a three-stage structure in which three rotor units 2 are arranged along the rotation axis z with a predetermined space between each pair of the adjacent rotor units 2, and the three rotor units 2 are secured to a common rotor shaft 45 with relative circumferential shift angles P2 and P3, as is shown in FIG. 13A. The relative angles P2 and P3 can be determined from a circumferential pitch of 30 degrees with which twelve rotor cores 10 and twelve permanent magnets 11 are arranged. Specifically, P2 and P3 are each 10 degrees. Twelve armature core groups 44 are arranged. Each armature core group comprises three armature cores 4 functionally arranged in three stages along the rotation axis z with predetermined spaces therebetween, and two common magnetic circuit portions that mechanically and magnetically connect the upper, middle and lower armature cores 4 to the armature cores 4 adjacent thereto circumferentially. The thus-constructed motor 40 has substantially the same function and advantage as those of the motor 20, but can provide higher torque and higher output than the two-stage motor 2, since the number of stages of the motor 40 is greater than the motor 20.

Further, in this structure, two or more rotor units are secured to the rotor shaft, with predetermined circumferential angles shifted to each other, and are configured to rotate integrally with each other, while a stator structure, in which all adjacent armature units are arranged with no relative shift angles in the rotation direction, is employed. Therefore, the casing can be produced easily, and a plurality of armature units or armature core groups can be assembled easily. In particular, since each armature core group comprises a plurality of armature units formed integral mechanically, easiness of assemblage and enhancement of assemblage accuracy can be expected, with the result that enhancement of motor driving characteristics, for example, suppression of vibration during rotation, can be easily realized.

Furthermore, the embodiment comprises a first common magnetic circuit portion and a second common magnetic circuit portion, and comprises an armature core group with the first or second common magnetic circuit portion, or with both the first and second common magnetic circuit portions. Accordingly, the axial length of each armature core in the multi-stage structure can be shortened, thereby providing the above-mentioned function and advantage as a rotary machine.

Referring then to FIGS. 14, 15A, 15B and 15C, the operation of the motor 40 of the embodiment will be described.

FIG. 14 shows the time history of the coil total flux $\phi 31$ of the upper (first-stage) base unit that occurs when an alternate current is applied to the first and second annular coils 5 and 6 of the base unit, the time history of the coil total flux $\phi 32$ of the middle (second-stage) base unit, and the time history of the coil total flux $\phi 33$ of the lower (third-stage) base unit. The above-mentioned three alternate currents have relative phase angles (electrical angles) of 120 degrees. If the magnetic fluxes $\phi 31$, $\phi 32$ and $\phi 33$ assume positive values, N poles are formed at the first magnetic pole portions 4a of each base unit 1, while if the magnetic fluxes $\phi 31$, $\phi 32$ and $\phi 33$ assume negative values, S poles are formed at the first magnetic pole portions 4a of each base unit 1.

Figures 15A, 15B:
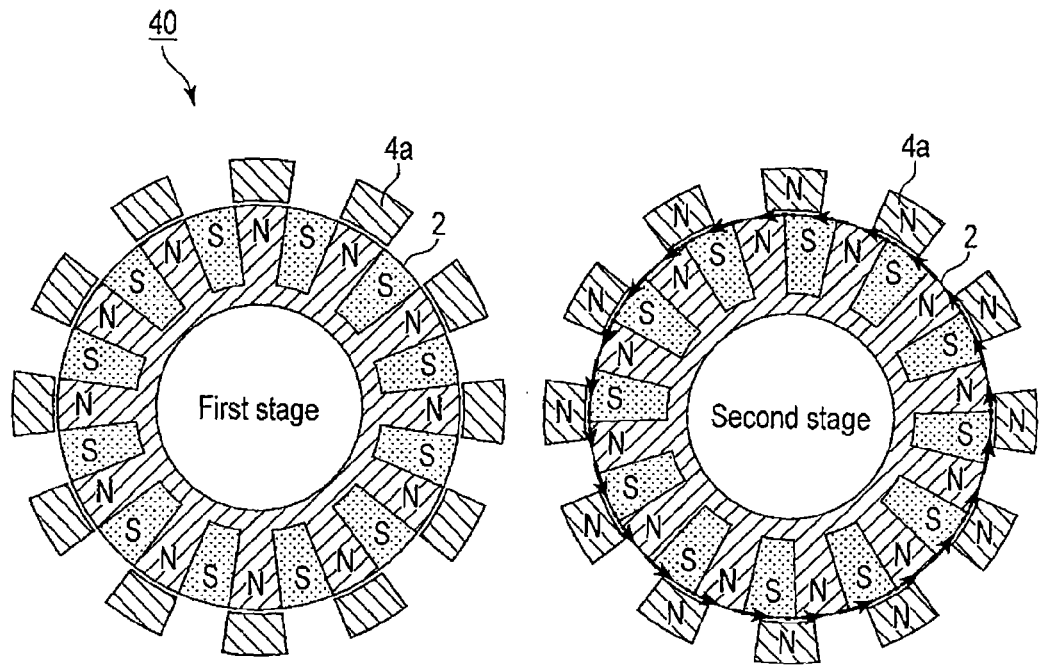
FIG. 15A shows the torque produced by an uppermost (first stage) base unit at a time point t3 in FIG. 14.
FIG. 15B shows the torque produced by a middle (second stage) base unit at the time point t3.
Figure 15C:
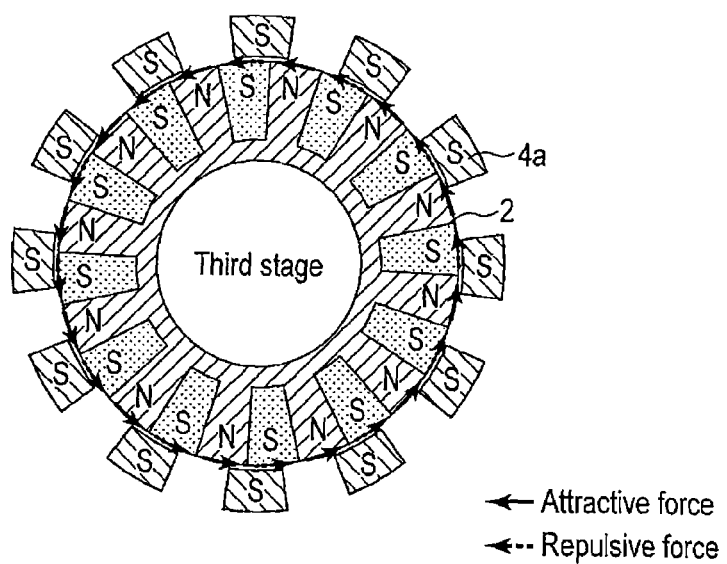
FIG. 15C shows the torque produced by a lowermost (third stage) base unit at the time point t3.
Figures 17A, 17B:
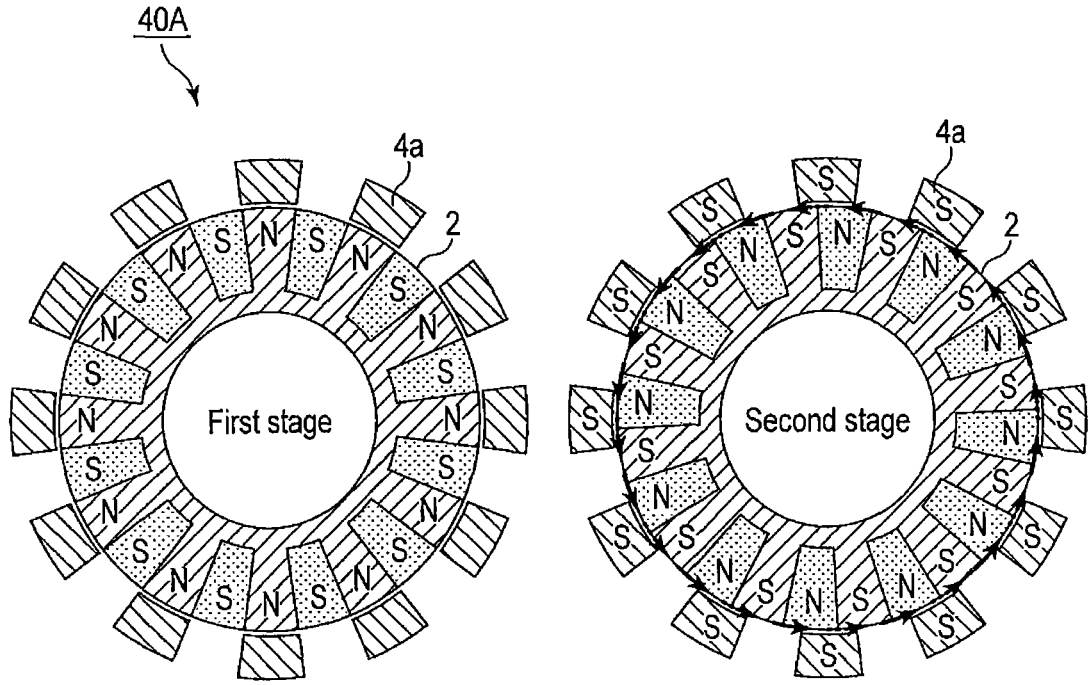
FIG. 17A shows the torque produced by an uppermost (first stage) base unit at a time point t3 in FIG. 16.
FIG. 17B shows the torque produced by a middle (second stage) base unit at the time point t3 in FIG. 16.
Figure 17C:
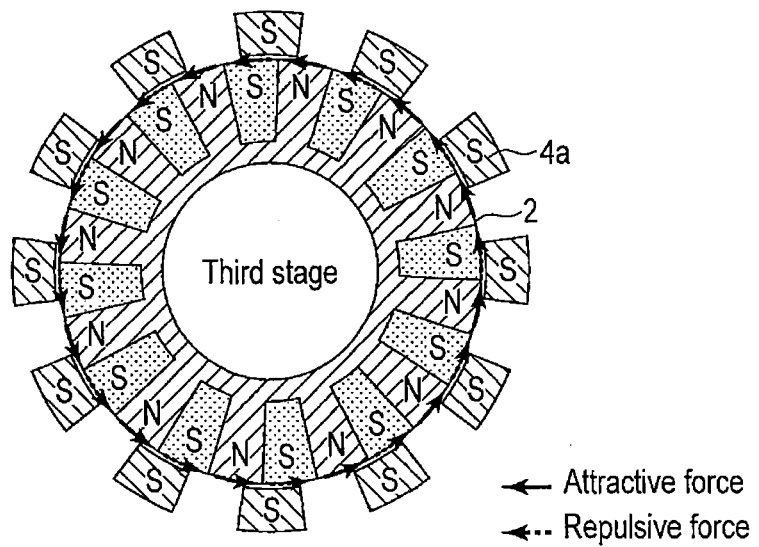
FIG. 17C shows the torque produced by a lowermost (third stage) base unit at the time point t3 in FIG. 16.
Figure 18A:
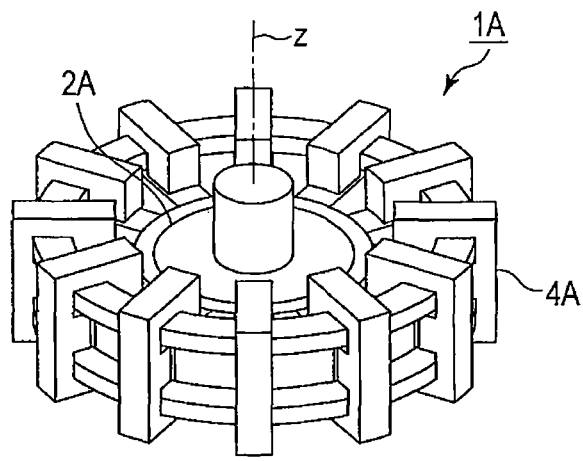
FIGS. 18A, 18B, 18C, 18D and 18E are views useful in explaining a base unit 1A obtained by modifying the base unit 1.
Figure 18B:
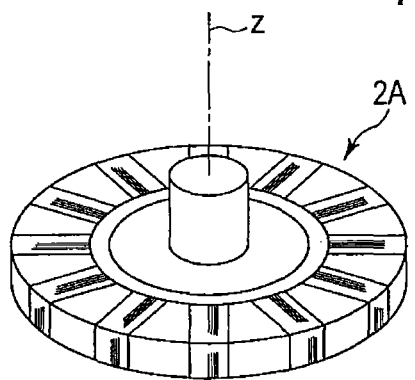
Figure 18C:
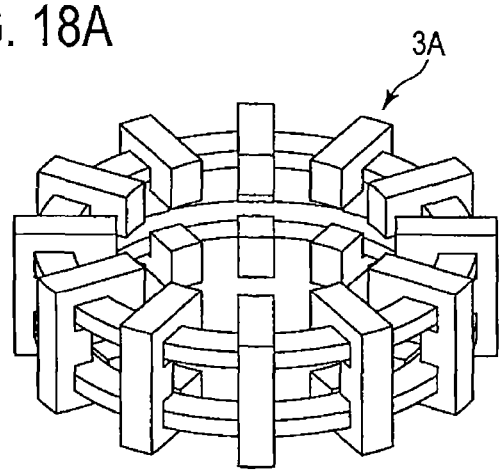
Figure 18D:
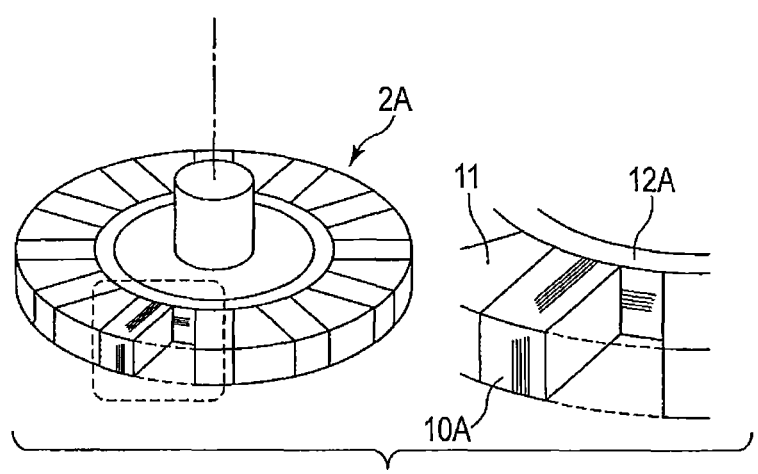
Figure 18E:
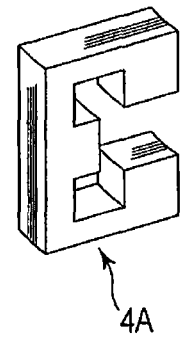

FIGS. 15A, 15B and 15C show the torques generated by the upper (first-stage), the middle (second-stage) and the lower (third-stage) base units at a time point t3 in FIG. 14. In the upper (first-stage) base unit, no torque is generated at the first magnetic pole portions 4a at the time point t3, as is shown in FIG. 15A. In the middle (second-stage) base unit, N poles are formed at the first magnetic pole portions 4a at the time point t3, and therefore repulsive forces occur between the N poles of the first magnetic pole portions 4a and those of the rotor core 10 and attractive forces occur between the N poles of the first magnetic pole portions 4a and the S poles of the permanent magnets 11, thereby imparting torque to the rotor unit 2, as is shown in FIG. 15B. In the lower (third-stage) base unit, S poles are formed at the first magnetic pole portions 4a at the time point t3, thereby imparting torque to the rotor unit 2, as is shown in FIG. 15C. Since thus, at the time point t3, torques are generated at the middle and lower base units of the motor 40, the motor 40 can have a higher torque than the motor 20. Further, torque fluctuation during rotation is more suppressed in the three-stage motor 40 than in the two-stage motor 20, thereby realizing more stabilized rotation. Furthermore, since the magnetization direction of each permanent magnet in a rotor unit is the same as that of the corresponding permanent magnet in another rotor unit axially adjacent to the first-mentioned rotor unit, the magnetic attractive forces of the permanent magnets of axially adjacent rotor units can be minimized during assemblage. As a result, the safety during assemblage working can be ensured, and reduction of working efficiency can be suppressed.

Referring now to FIGS. 16, 17A, 17B and 17C, a motor 40A as a modification of the motor 40 of the embodiment will be described. In the example shown in FIG. 16, the coil total flux $\phi 32a$ of the middle (second-stage) base unit that occurs when an alternate current is applied to the first and second annular coils 5 and 6 of the base unit differs in polarity from the magnetic flux $\phi 32$ of the motor 40. In accordance with this structure, at the peripheral surface of the rotor unit 2 of the middle (second-stage) base unit, S poles and N poles are formed at the rotor core 10 and the permanent magnets 11, respectively. The operation principle of the motor 40A is identical to that of the motor 40. In the structure of the motor 40A, the magnetic fluxes of the base units axially adjacent to each other are opposite to each other (in other words, the magnetization direction of each permanent magnet in a rotor unit is opposite to that of the corresponding permanent magnet in another rotor unit axially adjacent to the first-mentioned rotor unit). Accordingly, the fluxes of axially adjacent armature cores 4 offset each other, whereby the flux saturation of the armature cores 4, i.e., the flux saturation of the common magnetic circuit portions, is relaxed. This enables a motor further smaller and lighter than the motor 40 shown in FIGS. 15A, 15B and 15C to be realized.

Referring last to FIGS. 18A to 18E, a description will be given of a base unit 1A obtained by modifying the base unit 1 of the embodiment. In this modification, armature cores 4A, rotor cores 10A and a rotor core 12A are formed of laminated steel plates, and the base unit 1A comprises a rotor unit 2A and an armature unit 3A. More specifically, the armature cores 4A and the rotor cores 10A are formed by laminated steel plates. Each of the laminated steel plates of the cores 4A and 10A is formed by setting, as a lamination plane, a reference plane (not shown) including the rotation axis z, and stacking steel sheets along the lamination plane. The respective lamination planes set for the armature cores 4A and the rotor cores 10A extend radially and perpendicular to the upper (or lower) surface of the rotor unit 2A. Further, regarding the rotor core 12A, a lamination plane is set substantially perpendicular to the rotation axis z, and steel sheets are stacked along the lamination plane. In the structure of the base unit 1A, since the armature cores 4A, the armature core groups, the rotor cores 10A and the rotor core 12A are formed of laminated steel plates, iron loss accompanied by motor rotation, in particular, eddy-current loss, can be effectively suppressed. As a result, substantially the same torque fluctuation reduction effect as that of radial flux motors can be realized, regardless of the fact that in the embodiment, the armature magnetic flux and the rotor magnetic flux form three-dimensional magnetic paths, whereby high efficiency can be expected in addition to the realization of high torque and high output. The portion of the base unit 1A corresponding to the rotor core 12, and the rotor shaft may be formed of a non-magnetic substance.

As described above, the embodiment and modifications can provide compact motors of a structure in which the axial length of each rotor unit can be made short, each base unit can be easily made compact, and a magnetic clearance for preventing magnetic interference that will occur when a plurality of base units are arranged in stages is not necessary. For instance, the motors are transversal flux motors with magnetic paths extending along the axis of rotation. In particular, the embodiment and modifications can provide a motor of a new structure that can realize a compact multi-stage assembly by sharing armature cores between adjacent base units, the base units being made compact by relaxing the magnetic saturation of the armature cores, the output of the motor being kept high.

Since thus, the motors of the embodiment and modifications can be made compact as a whole, with its driving performance in, in particular, output and torque enhanced, they are expected to be used as high-torque, high-output driving sources in a variety of fields requiring extremely high torque and output density, such as fields of working machines, ships and vessels, automobiles, and robots.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor comprising:
   at least two base units arranged along an axis of rotation of the motor,
   the at least two base units each including a rotor unit and an armature unit,
      the rotor unit being formed cylindrical, rotatable about the axis of rotation, and provided with permanent magnets,
      the armature unit including a plurality of tripolar armature cores, and a first annular coil and a second annular coil coaxial with respect to the axis of rotation, the tripolar armature cores each having a first stator magnetic pole portion, a second stator magnetic pole portion and a third stator magnetic pole portion, the first to third stator magnetic pole portions opposing a plurality of surfaces of the rotor unit with a space defined therebetween,
   wherein
   the first stator magnetic pole portion opposes an outer circumference side of the rotor unit,
   the second stator magnetic pole portion opposes an upper side of the rotor unit,
   the third stator magnetic pole portion opposes a lower side of the rotor unit,
   the tripolar armature cores of each of the at least two base units are arranged around a circumference of the rotor unit of the each of the at least two base units; and
   in each of the at least two base units, the first annular coil is provided in a first annular space provided around the first and second stator magnetic pole portions and the rotor unit, the second annular coil is provided in a second annular space provided around the first and third magnetic pole portions and the rotor unit, and opposite currents are applied to the first and second annular coils.

2. The motor according to claim 1, wherein in each of the at least two base units,
   the first magnetic pole portion opposes a peripheral surface of the rotor unit with a space therebetween; and
   the second and third magnetic pole portions oppose an upper surface and a lower surface of the rotor unit with spaces therebetween, respectively, the upper surface and the lower surface being perpendicular to the axis of rotation, the peripheral surface, the upper surface and the lower surface being included in the surfaces.

3. The motor according to claim 1, further comprising a casing surrounding the at least two base units,
   wherein
   the rotor units of the at least two base units are circumferentially shifted by the relative angle and are configured to rotate together, with no circumferentially relative shift angles with respect to the armature units of the at least two base units, the armature units being formed as one body; and
   the casing secures the armature units, or secures armature core groups, each of the armature core groups including a number of armature cores which are included in the tripolar armature cores, have a circumferentially same phase, and are mechanically and magnetically coupled to each other.

4. The motor according to claim 3, wherein
   the at least two base units comprise three base units;
   the armature core groups each comprise at least one of a first common magnetic circuit portion and a second common magnetic circuit portion;
   the first common magnetic circuit portion magnetically couples a part of a magnetic path formed at a second magnetic pole portion of a first armature core to a part of a magnetic path formed at a second magnetic pole portion of a second armature core, the first armature core being included in the armature cores of one of the three base units, the second armature core being adjacent to the first armature core and included in the armature cores of another of the three base units; and
   the second common magnetic circuit portion magnetically couples a part of a magnetic path formed at a third magnetic pole portion of the first armature core to a part of a magnetic path formed at a second magnetic pole portion of a third armature core, the third armature core being adjacent to the first armature core and included in the armature cores of the other of the three base units.

5. The motor according to claim 1, wherein in each of the at least two base units,
   the rotor unit comprises a plurality of first rotor cores and the permanent magnets, the first rotor cores and the permanent magnets providing a peripheral portion of the rotor unit, the first rotor cores and the permanent magnets being circumferentially alternately arranged with a pitch, the permanent magnets being radially magnetized, or each of the permanent magnets being magnetized parallel to a representative radial axis set for the each of the permanent magnets, and also being magnetized all in a positive direction or all in a negative direction, the positive direction being a radial direction from the axis of rotation to a circumference of the rotor units;

the rotor unit further comprises a second rotor core formed annular at a radially inner portion thereof to provide magnetic paths of the permanent magnets; and the permanent magnets and the first rotor cores cooperate to form magnetic paths magnetically coupled via the second rotor core, the first rotor cores and the second rotor core being mechanically separate from one another and magnetically coupled with one another, or being mechanically and magnetically coupled with one another.

6. The motor according to claim 5, wherein the armature cores and the first rotor cores are formed of laminated steel plates that define a lamination direction place being parallel to the rotation axis; and the second rotor core is formed of laminated steel plates that define a lamination direction place being perpendicular to the rotation axis.

7. The motor according to claim 5, wherein a magnetization direction of each of the permanent magnets of one of the rotor units of the at least two base units is same as or opposite to a magnetization direction of a corresponding one of the permanent magnets of another of the rotor units of the at least two base units.

* * * * *